United States Patent
Ortelt et al.

(10) Patent No.: US 9,994,671 B2
(45) Date of Patent: Jun. 12, 2018

(54) CURABLE COMPOSITION WITH HIGH FRACTURE TOUGHNESS

(71) Applicant: Evonik Degussa GmbH, Essen (DE)

(72) Inventors: Martina Ortelt, Duelmen (DE); Dirk Fuchsmann, Haltern am See (DE); Eike Langkabel, Wegberg (DE); Britta Kohlstruk, Gladbeck (DE); Katharina Karns, Marl (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days. days.

(21) Appl. No.: 14/766,226

(22) PCT Filed: Jan. 15, 2014

(86) PCT No.: PCT/EP2014/050714
§ 371 (c)(1),
(2) Date: Aug. 6, 2015

(87) PCT Pub. No.: WO2014/121987
PCT Pub. Date: Aug. 14, 2014

(65) Prior Publication Data
US 2015/0376327 A1 Dec. 31, 2015

(30) Foreign Application Priority Data

Feb. 6, 2013 (EP) .................... 13154220
Jun. 28, 2013 (EP) .................... 13174322
Aug. 7, 2013 (EP) .................... 13179541

(51) Int. Cl.
| | |
|---|---|
| *C08L 63/00* | (2006.01) |
| *C08G 59/14* | (2006.01) |
| *C08G 59/50* | (2006.01) |
| *C08G 59/56* | (2006.01) |
| *C09D 163/00* | (2006.01) |
| *C09J 163/00* | (2006.01) |
| *C08G 59/24* | (2006.01) |

(52) U.S. Cl.
CPC ....... *C08G 59/5026* (2013.01); *C08G 59/245* (2013.01); *C08G 59/50* (2013.01); *C08G 59/502* (2013.01); *C08G 59/56* (2013.01); *C08L 63/00* (2013.01); *C09D 163/00* (2013.01); *C09J 163/00* (2013.01)

(58) Field of Classification Search
CPC .. C08G 59/50; C08G 59/245; C08G 59/5026; C08G 59/56; C08G 59/502; C09D 163/00; C09J 163/00; C08L 63/00

USPC .......................................... 523/400; 525/523
See application file for complete search history.

(56) References Cited

U.S. PATENT DOCUMENTS

| | | | |
|---|---|---|---|
| 5,591,812 A | 1/1997 | Starner | |
| 5,618,905 A | 4/1997 | Marsella et al. | |
| 5,688,905 A * | 11/1997 | Walker ................. | C08G 59/50 525/420 |
| 2012/0328811 A1 | 12/2012 | Patel et al. | |
| 2015/0203629 A1 | 7/2015 | Ortelt et al. | |

FOREIGN PATENT DOCUMENTS

| | | |
|---|---|---|
| CN | 1151427 A | 6/1997 |
| CN | 102 796 349 A | 11/2012 |
| EP | 0 737 702 A2 | 10/1996 |
| EP | 0 737 702 A3 | 10/1996 |
| EP | 2 546 230 A1 | 1/2013 |
| WO | WO 2014/108305 A2 | 7/2014 |

OTHER PUBLICATIONS

U.S. Appl. No. 14/425,180, filed Mar. 2, 2015, US2015/0203629 A1, Ortelt, et al.
U.S. Appl. No. 14/653,037, filed Jun. 17, 2015, Spyrou, et al.
International Search Report dated Mar. 21, 2014 in PCT/EP2014/050714.

* cited by examiner

*Primary Examiner* — David T Karst
(74) *Attorney, Agent, or Firm* — Grüneberg and Myers PLLC

(57) ABSTRACT

A curable composition including an epoxy resin, an open-chain polyamine, and a compound of the formula (I); a hardened composition prepared by curing the curable composition; a process for coating a surface or impregnating a textile sheet, including applying and hardening the curable composition; and a surface, a fiber composite material, a coating, or an adhesive including the hardened composition, (I)

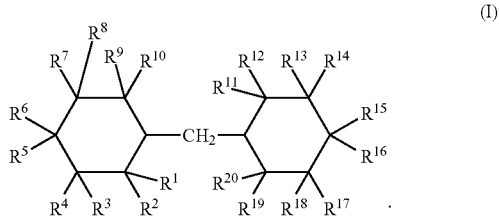

22 Claims, No Drawings

CURABLE COMPOSITION WITH HIGH FRACTURE TOUGHNESS

The present invention relates to a curable or hardened composition comprising at least one epoxy resin, one open-chain polyamine and one compound of the formula (I)

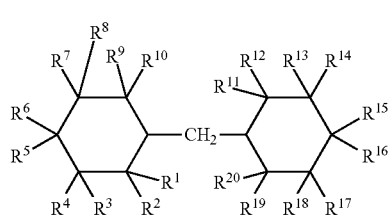

where the moieties $R^1, R^2, R^3, R^4, R^5, R^6, R^7, R^8, R^9, R^{10}, R^{11}, R^{12}, R^{13}, R^{14}, R^{15}, R^{16}, R^{17}, R^{18}, R^{19}$ and $R^{20}$ respectively and mutually independently are selected from the group comprising hydrogen, methyl, ethyl, propyl, isopropyl and amine, with the proviso that at least one moiety from the group comprising $R^1, R^2, R^3, R^4, R^5, R^6, R^7, R^8, R^9$ and $R^{10}$ is amine and at least one moiety from the group comprising $R^{11}, R^{12}, R^{13}, R^{14}, R^{15}, R^{16}, R^{17}, R^{18}, R^{19}$ and $R^{20}$ is amine; to use of a hardener combination comprising an aliphatic diamine and a compound of the formula (I) for the curing of epoxy resin; to a process for the coating of a surface or for the impregnation of a textile sheet, comprising the steps of (a) application and (b) hardening of the curable composition, and also to a surface, fibre composite material, coating or adhesive comprising the hardened composition.

Epoxy resins are building blocks for polymers which comprise two or more epoxy groups per molecule. The reaction of these resins with many hardeners leads to crosslinked polymers for which there is great industrial demand. These polymers can be thermosets and are used by way of example in the civil engineering (construction) sector, particularly in industrial floor coatings, in sealing systems and in concrete-renovation products, composites (fibre composite materials), potting compositions, coating materials and adhesives. An overview of the resins and hardeners, and also of use of these in the civil engineering sector, inclusive of the properties of the materials, is found in H. Schuhmann, "Handbuch Betonschutz durch Beschichtungen" [Handbook of concrete protection by coatings], Expert Verlag 1992, pp. 396-428. The use of the resins and hardeners for the composites sector is described in P. K. Mallick "Fiber-Reinforced Composites, Materials, Manufacturing, and Design", CRC Press, pp. 60-76.

Epoxy resins are often not marketed in cured, crosslinked form, but instead as curable composition or individual constituents of such compositions, these being combined by the user only shortly prior to the desired start of hardening. A curable mixture comprises at least one epoxy resin with at least two reactive epoxy groups per molecule, and also at least one hardener, which is frequently one or more polyamines. For many applications it is also advisable to use complementary constituents as auxiliaries, examples being reactive diluents, catalysts, pigments, flame retardants, solvents, fillers, additives or the like. Suitable unreactive constituents are described in the prior art, for example in M. A. Boyle, C. J. Martin, and J. D. Neuner, Epoxy Resins, Composites, Vol. 21, ASM Handbook ASM International, 2001, pp. 78-89.

The prior art teaches that the properties of the hardened epoxy resin composition can be influenced decisively by way of the selection of the amine used as hardener. The use of isophoronediamine (IPD), which is the most widely used cycloaliphatic amine hardener, leads to hardened compositions with relatively high glass transition temperature (Tg), which however is a result of relatively low fracture toughness. In contrast, the use of open-chain polyamines as hardeners gives the hardened composition high fracture toughness; however, this is obtained at the cost of a markedly decreased glass transition temperature.

There is a considerable requirement for curable epoxy resin compositions with high fracture toughness and with minimized reduction of glass transition temperature. The increase in fracture toughness should moreover not have any attendant substantial disadvantages in respect of other mechanical properties of the hardened composition, for example modulus of elasticity, flexural strength and resistance to corrosion and to solvents. Finally, the selection of the amine hardener has an effect on properties relevant for the processability of the unhardened composition, for example its viscosity or reactivity.

The possibility of using a combination of two amine hardeners, in particular of an open-chain polyamine such as a polyetheramine and of IPD, for the curing of epoxy resins is described as particularly advantageous in the prior art. The content of the open-chain polyamine here can be adjusted in such a way that the glass transition temperature is equal to or above a critical value that can be selected in accordance with the application. The fracture toughness depends on the selected ratio of open-chain polyamine and IPD, but cannot exceed the value determined by way of the amount of the open-chain polyamine.

Against this background, the object underlying the invention consists in providing a hardener combination which is made of an open-chain polyamine with another amine hardener and which, in a curable composition with an epoxy resin, gives the hardened epoxy resin mixture particularly high fracture toughness together with the highest possible glass transition temperature.

The subject matter of the present application, and also in particular the subject matter of the attached independent claims, achieves these and other objects, and the dependent claims here provide embodiments.

A first aspect of the problem underlying the invention is solved by way of a curable or hardened composition comprising at least one epoxy resin, one open-chain polyamine and one compound of the formula (I)

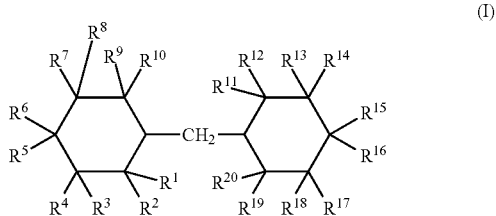

where the moieties $R^1, R^2, R^3, R^4, R^5, R^6, R^7, R^8, R^9, R^{10}, R^{11}, R^{12}, R^{13}, R^{14}, R^{15}, R^{16}, R^{17}, R^{18}, R^{19}$ and $R^{20}$ respectively and mutually independently are selected from the group comprising hydrogen, methyl, ethyl, propyl, isopropyl and amine, with the proviso that at least one moiety from the group comprising $R^1, R^2, R^3, R^4, R^5, R^6, R^7, R^8, R^9$ and $R^{10}$ is amine and at least one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine, where the epoxy resin preferably has two epoxy groups per molecule and is particularly preferably selected from the group which comprises bisphenol A diglycidyl ether and bisphenol F diglycidyl ether, where the open-chain polyamine has at least two primary amine groups on an aliphatic main chain having a carbon chain composed exclusively of carbon atoms and of hydrogen atoms.

A second aspect of the problem underlying the invention is solved by way of a use of a hardener combination comprising an open-chain polyamine and a compound of the formula (I)

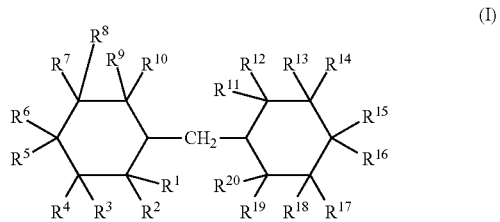

for the curing of epoxy resin, where the moieties $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ respectively and mutually independently are selected from the group comprising hydrogen, methyl, ethyl, propyl, isopropyl and amine, with the proviso that at least one moiety from the group comprising $R^1$, $R^2$, $R^3$, $R^4$, $R^5$, $R^6$, $R^7$, $R^8$, $R^9$ and $R^{10}$ is amine and at least one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine, where the open-chain polyamine has at least two primary amine groups on an aliphatic main chain having a carbon chain composed exclusively of carbon atoms and of hydrogen atoms.

In a first embodiment of the first or second aspect, the problem is solved by way of a curable or hardened composition or use where precisely one moiety from the group comprising $R^1$, $R^2$, $R^3$, $R^4$, $R^5$, $R^6$, $R^7$, $R^8$, $R^9$ and $R^{10}$ is amine and precisely one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine.

In a second embodiment of the first or second aspect, which is also an embodiment of the first embodiment, the problem is solved by way of a curable or hardened composition or use where precisely one moiety from the group comprising $R^1$, $R^2$, $R^3$, $R^4$, $R^5$, $R^6$, $R^7$, $R^8$, $R^9$ and $R^{10}$ is amine and precisely one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine and every other moiety is hydrogen.

In a third embodiment of the first or second aspect, which is also an embodiment of the first to second embodiment, the problem is solved by way of a curable or hardened composition or use where the compound of the formula (I) is diaminodicyclohexylmethane.

In a fourth embodiment of the first or second aspect, which is also an embodiment of the first to third embodiment, the problem is solved by way of a curable hardened composition or use where the open-chain polyamine has a substituted or unsubstituted carbon chain having a total length of from four to eight and preferably six carbon atoms, where the carbon chain preferably has substitution by alkyl groups.

In a fifth embodiment of the first or second aspect, which is also an embodiment of the first to fourth embodiment, the problem is solved by way of a curable or hardened composition or use according to any of Claims 1 to 6, where the open-chain polyamine has the formula $H_2N-(CH_2)_z-NH_2$ and z is from 2 to 12.

In a sixth embodiment of the first or second aspect, which is also an embodiment of the first to fifth embodiment, the problem is solved by way of a curable or hardened composition or use where the open-chain polyamine is hexamethylenediamine or trimethylhexamethylenediamine.

In a seventh embodiment of the first or second aspect, which is also an embodiment of the first to sixth embodiment, the problem is solved by way of a curable or hardened composition or use where the ratio by weight of the compound of the formula (I) to open-chain polyamine is at least 50:50.

In an eighth embodiment of the first or second aspect, which is also an embodiment of the first to seventh embodiment, the problem is solved by way of a curable or hardened composition or use where the ratio by weight of the compound of the formula (I) to open-chain polyamine is from 70:30 to 90:10.

In a ninth embodiment of the first or second aspect, which is also an embodiment of the first to eighth embodiment, the problem is solved by way of a curable or hardened composition where the epoxy resin is selected from the group comprising epoxy resins based on bisphenol A diglycidyl ether, bisphenol F diglycidyl ether, chain-extended bisphenol A resins having molecular weights of from 700 to 5000, epoxidized novolaks, triglycidyl-p-aminophenol, tetraglycidyl-methylenedianiline and diglycidyl hexahydrophthalate and cycloaliphatic types.

In a tenth embodiment of the first aspect, which is also an embodiment of the first to ninth embodiment, the problem is solved by way of a curable composition further comprising at least one further substance selected from the group comprising reaction accelerators, preferably from the group of organic acids or of tertiary amines, reactive diluents, preferably from the group of mono- or polyfunctional, room-temperature-liquid epoxy compounds, solvents, pigment, flame retardant, filler and additive.

In an eleventh embodiment of the first aspect, which is also an embodiment of the first to eleventh embodiment, the problem is solved by way of a curable composition further comprising a reactive diluent, where the ratio by weight of epoxy resin to reactive diluent is from 75:25 to 95:5, preferably from 80:20 to 90:10.

In a third aspect, the problem underlying the invention is solved by way of a process for the coating of a surface or for the impregnation of a textile sheet, comprising the steps of (a) application and (b) hardening of the curable composition according to the first aspect of the present invention.

In a fourth aspect, the problem underlying the invention is solved by way of a surface, fibre composite material, coating or adhesive comprising the hardened composition according to the first aspect of the present invention.

The present invention is based on the surprising discovery of the inventors that the replacement of IPD by a compound of the formula (I) in a curable composition with an open-chain polyamine as co-hardener and with an epoxy resin leads to markedly more advantageous properties of the material of the hardened composition, in particular markedly higher fracture toughness together with markedly higher glass transition temperature.

The curable or hardened composition of the invention firstly comprises an epoxy resin. In a preferred embodiment, the expression "epoxy resin" as used herein means an organic compound having at least two epoxy groups reactive towards hardeners, preferably amine hardeners. It is preferable that the epoxy resin is selected from the group comprising epoxy resins based on bisphenol A diglycidyl ether, bisphenol F diglycidyl ether and cycloaliphatic types. Cycloaliphatic types are by way of example 3,4-epoxycyclohexylepoxyethane or 3,4-epoxycyclohexylmethyl 3,4-epoxycyclohexanecarboxylate. Other examples of epoxy resins that can be used according to the invention comprise chain-extended bisphenol A resins with molecular weights of from 700 to 5000, epoxidized novolaks, triglycidyl-p-aminophenol, tetraglycidyl-methylenedianiline and diglycidyl hexahydrophthalate. In a preferred embodiment, the epoxy resin comprises at least two epoxy groups where the carbon-carbon bond is not part of any larger aliphatic ring in the same molecule. Bisphenol A-based epoxy resins and bisphenol F-based epoxy resins are particularly preferred according to the invention. The prior art describes numerous other suitable open-chain epoxides, for example in U.S. Pat. No. 6,248,204. Compounds of this type are obtainable commercially. The composition of the invention here can also comprise more than one epoxy resin. In the event that the curable composition comprises, alongside the reactive components, other additional substances such as solvents or fillers, the proportion of the entirety of the epoxy resins and amine hardeners in the composition is preferably at least 1, 5, 10, 20, 30, 40, 50, 60, 70, 80, 90 or 99 percent by weight. The epoxy resin preferably has from 1.5 to 2.5 epoxy groups per molecule, more preferably two. In another preferred embodiment, a mixture comprising more than one epoxy resin is used and has an average of from 1.5 to 2.5 epoxy groups per molecule, more preferably from 1.8 to 2.2, most preferably two. In another preferred embodiment, the at least one epoxy resin is selected from the group comprising bisphenol A diglycidyl ether and bisphenol F diglycidyl ether.

The curable or hardened composition of the invention comprises, as one of the two essential amine hardeners, an open-chain polyamine. In a preferred embodiment, the expression "open-chain polyamine" as used herein means an organic compound of linear structure having at least two, preferably precisely two, amine groups reactive towards epoxy groups, where substitutions and branching, for example involving one or more alkyl groups, is possible. To the extent that the polyamine has precisely two amine groups, it is preferable that at least one thereof is a primary amine group. The main chain of the open-chain amine can be of aliphatic type, but it is also possible that a polyether or a polyamine with a main chain made of one or more secondary amines is involved. The prior art describes numerous other suitable open-chain polyamines, for example in U.S. Pat. No. 6,248,204.

In a particularly preferred embodiment, the "open-chain polyamine" is a compound which comprises at least two, preferably precisely two, primary amine groups on an aliphatic main chain or consists of said amine groups and of the aliphatic main chain, where the aliphatic main chain is preferably a branched or linear, but not cyclic hydrocarbon chain, and where the hydrocarbon chain is composed exclusively of carbon atoms and of hydrogen atoms.

In a most preferred embodiment, the open-chain polyamine is the open-chain polyamine hexamethylenediamine or trimethylhexamethylenediamine. This can be 2,2,4-trimethylhexamethylenediamine, 2,4,4-trimethylhexamethylenediamine or, particularly preferably, from a mixture of 2,2,4-trimethylhexamethylenediamine and 2,4,4-trimethylhexamethylenediamine.

The ratio of the epoxy resin content which comprises the entirety of the epoxy resins used, to the hardener content, which comprises the entirety of the amine hardeners used, in the composition of the invention can be selected for the curable composition of the invention in such a way that epoxy groups and amine groups are present in a stoichiometric ratio, or else in a sub- or superstoichiometric ratio. In the event that some latency is desired with regard to the timing of the reaction, preference is given to a substoichiometric ratio, i.e. an excess of epoxy groups.

The wording to the effect that a curable or hardened composition "comprises" epoxy resin, hardener and other substances means in a preferred embodiment as used herein that in the case of the curable composition, i.e. composition that has not yet completed its reaction or has not yet fully completed its reaction, the corresponding substances comprises in free, reactive form, while in the case of the hardened composition this wording means that the constituents are present in completely reacted form as constituents of the crosslinked polymers produced during hardening. By way of example, hardened compositions of the invention also comprise open-chain polyamines which have no remaining free amine groups, but instead have amine groups that have completed their reaction with epoxy groups of the resin component.

The curable or hardened composition of the invention comprises, as second of the two essential amine hardeners, a compound with the formula (I)

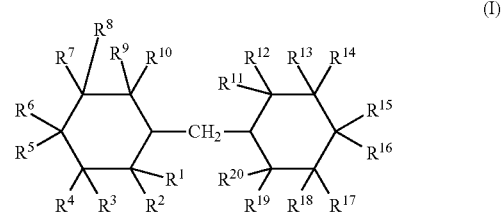

(I)

where the moieties $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ respectively and mutually independently are selected from the group comprising hydrogen, methyl, ethyl, propyl, isopropyl and amine, with the proviso that at least one moiety from the group comprising $R^1$, $R^2$, $R^3$, $R^4$, $R^5$, $R^6$, $R^7$, $R^8$, $R^9$ and $R^{10}$ is amine and at least one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine. In a preferred embodiment, precisely one moiety from the group comprising $R^1$, $R^2$, $R^3$, $R^4$, $R^5$, $R^6$, $R^7$, $R^8$, $R^9$ and $R^{10}$ is amine and precisely one moiety from the group comprising $R^{11}$, $R^{12}$, $R^{13}$, $R^{14}$, $R^{15}$, $R^{16}$, $R^{17}$, $R^{18}$, $R^{19}$ and $R^{20}$ is amine. In a particularly preferred embodiment, all of the moieties $R^2$, $R^4$, $R^6$, $R^8$, $R^{10}$, $R^{12}$, $R^{14}$, $R^{16}$, $R^{18}$ and $R^{20}$ here are hydrogen.

In a preferred embodiment, the compound according to formula (I) is diaminodicyclohexylmethane. Diaminodicyclohexylmethane comprises many different isomers and mixtures thereof. In a particularly preferred embodiment, the diaminodicyclohexylmethane is 4,4'-diaminodicyclohexylmethane. The various isomers are marketed by various producers in the form of mixtures with the trade name "PACM", and these can be used according to the invention as diaminodicyclohexylmethane and by way of example comprise from 15 to 60 percent by weight of trans, trans-diaminodicyclohexylmethane, from 30 to 60 percent by weight of cis, trans-diaminodicyclohexylmethane, from 5 to 40 percent by weight of cis, cis-diaminodicyclohexylmethane and from 1 to 10 percent by weight of ortho, para-diaminodicyclohexylmethane. However, any of the isomers mentioned is also suitable for the use according to the invention. It is particularly preferable to use trans, trans-diaminodicyclohexylmethane or cis, trans-diaminodicyclohexylmethane according to the invention as compound of the formula (I). It is possible to use mixtures which comprise isomers other than trans, trans-diaminodicyclohexylmethane, cis, trans-diaminodicyclohexylmethane, cis, cis-diaminodicyclohexylmethane or ortho, para-diaminodicyclohexylmethane. In a preferred embodiment, an isomer mixture of diaminodicyclohexylmethane is used as compound of the formula (I) where the content of trans, trans-diaminodicyclohexylmethane is from 17 to 24 percent by weight and the content of isomer cis,trans-diaminodicyclohexylmethane, cis,cis-diaminodicyclohexylmethane and 2,4-diaminodicyclohexylmethane is from 40 to 45 percent by weight, from 20 to 25 percent by weight and, respectively, from 10 to 14 percent by weight. A corresponding isomer mixture is obtainable commercially with trade name "Vestamin PACM".

The compounds of the formula (I) are obtainable commercially or can be obtained by hydrogenation from the corresponding aromatic precursors. EP 1 519 912 describes a suitable hydrogenation process.

It is preferable that the open-chain polyamine has a substituted or unsubstituted carbon chain with an overall length of 1, 2, 3, 4, 5, 6, 7, 8, 10, 11, 12, 13, 14, 15, 16, 17, 18, 19 or 20 carbon atoms, preferably from 4 to 8, most preferably from 6 carbon atoms. In the case of a substituted carbon chain it is preferable that the substituents are alkyl substituents, such as methyl, ethyl, propyl, butyl and isopropyl.

It is preferable that the open-chain polyamine is a compound of the formula $H_2N-(CH_2)_z-NH_2$, where z is 1, 2, 3, 4, 5, 6, 7, 8, 9, 10, 12, 13, 14, 15, 16, 17, 18, 19 or 20, preferably from 2 to 12.

It is preferable that the compound of the formula (I) and the open-chain polyamine are not used in an arbitrary ratio by weight with respect to one another, but instead are used in a mixture which comprises predominantly the compound of the formula (I). The ratio by weight of the compound of the formula (I) to the open-chain polyamine is preferably more than 50:50, preferably from 60:40 to 95:5, still more preferably from 65:35 to 92.5:7.5, most preferably from 70:30 to 90:10. In a preferred embodiment, the expression "a ratio of the compound (I) to the open-chain polyamine of more than 50:50" here means that the weight of the compound (I) in the composition exceeds that of the open-chain polyamine. By way of example, there can be 51 parts by weight of the compound (I) and 50 parts by weight of the open-chain polyamine present in the composition.

The curable composition of the invention preferably comprises, alongside the epoxy resin, the open-chain polyamine and the compound of the formula (I), a reactive diluent. The reactive diluent can serve for the establishment of a viscosity that is suitable for production, homogenization, processing or use. The reactive diluent is preferably selected from the group of mono-, bi- or polyfunctional, room-temperature-liquid epoxy compounds, e.g. butyl glycidic ether, phenyl glycidic ether, glycidic ether of versatic acid, C12-C14 glycidic ether, C13-C15 glycidic ether, p-tert-butylphenyl glycidic ether, 1,6-hexane diglycidic ether, 1,4-butane diglycidic ether, neopentyl glycol diglycidic ether, glycerol triglycidic ether, pentaerythropolyglycidic ether, trimethylolpropane triglycidic ether and cresyl glycidic ether.

It is advantageous to use the reactive diluent in a mixing ratio with respect to the epoxy resin where the composition comprises sufficient thereof to provide processability. The ratio by weight of epoxy resin to reactive diluent is preferably from 75:25 to 95:5, more preferably from 80:20 to 90:10.

In another preferred embodiment, the curable composition of the invention comprises at least one reaction accelerator, preferably from the group of organic acids or of tertiary amines, for example salicylic acid, aminoethylpiperazine, tris(N,N-dimethylaminomethyl)phenol. Other suitable reaction accelerators are described in the prior art, for example in U.S. Pat. No. 3,261,809.

In another preferred embodiment, the curable composition of the invention comprises at least one solvent, e.g. xylene, acetone or butyl acetate.

In another preferred embodiment, the curable or hardened composition of the invention comprises pigments, fillers and/or additives.

If the intention is that surfaces be coated with the curable or hardened composition of the invention or that textile sheets be impregnated with the curable or hardened composition of the invention, the composition is firstly applied in liquid, not yet hardened form to the surface or to the textile sheet. The application process can comprise contact exclusively with the surface, for example through spreading, or else treatment of the entire article, for example through immersion or flow-coating. The curable or hardened composition is suitable for the treatment of numerous surfaces made of various materials. Equally, it is possible to impregnate various types of textile sheets. In a preferred embodiment, the expression "textile sheet" is used herein to mean any structure made of epoxy-resin-composition-wettable fibres, examples being woven fabrics, multiaxial laid scrims, UD (unidirectional) laid scrims, UD tapes, nonwovens, papers, chopped-glass mats and continuous (roving) mats. The fibres can by way of example be composed of glass, carbon, aramid or basalt or of other natural fibres (e.g. cotton or hemp).

The hardening of the curable composition of the invention in step b) of the process of the invention proceeds under conditions which permit the hardening of the respective selected curable composition. These conditions depend on the specific composition, but the person skilled in the art can easily discover suitable compositions by using the technical knowledge possessed by such a person or through routine experimentation. By way of example, elevated temperatures and the presence of reaction accelerators promote the hardening of the composition. Lee & Neville "Handbook of Epoxy resins" McGraw Hill Inc. 1967, Chapter 6 'Characterization of Epoxy-Resin Curing Agent Systems', pp. 6-1 to 6-20 for example describes other methods, and also describes factors to be considered in relation to the control of the hardening process.

The present invention is further illustrated by the following figures and non-restrictive examples, which reveal further features, embodiments, aspects and advantages of the present invention.

EXAMPLES

The following examples reveal that use of a hardener combination of the invention comprising an open-chain polyamine and a compound of the formula (I) achieves surprisingly high increases in the fracture toughness of the hardened epoxy with comparable values for other properties of the material such as Tg, strength values and modulus of elasticity. Trimethylhexamethylenediamine (VESTAMIN TMD, mixture of 2,2,4-trimethylhexamethylenediamine and 2,4,4-trimethylhexamethylenediamine), hexamethylenediamine (HDA), or Dytec-A (2-methyl-1,5-pentanediamine) (commercially available product from Invista). 4,4'-Diaminodicyclohexylmethane (PACM) is used as compound of the formula (I). Other materials used are VESTAMIN IPD (isophoronediamine) and EPIKOTE Resin 828, diglycidyl ether of bisphenol A.

Experimental:
Where necessary, the first process is production of the hardener mixture (glass beaker, magnetic stirrer) and combination of this with the epoxy resin component. The preparation is mixed in vacuo in a DAC600.1 VAC-P high-speed mixer from Hauschild in 20 s at 1000 rpm and 100 s at 1500 rpm. The resultant, degassed mixture is poured into 2 steel moulds with dimensions 200×200×6 mm and 200×200×4 mm which have been preheated to curing temperature (to 120° C. in the example here). The mould surfaces were treated in advance with ACMOScoat 82-7008 release agent. The moulds comprising the resin/hardener mixture are then left for 30 min at 120° C. in a convection oven. Once the curing process has ended, the moulds are cooled with the oven switched off and the oven door open. The glass transition temperature (Tg) of the 4 mm plaques is determined by means of DSC measurement with a heating rate of 10 K/min, and the flexural strength of the plaques is determined in accordance with DIN EN ISO 178. The fracture toughness (K1c) of the 6 mm plaques is determined by a method based on ASTM D5045 (CT test specimen with W=35 mm) by the method described in German Patent DE 100 23 752.

Results:

| Composition [g] | PACM 100 828 Comparative Example 1 | PACM/ TMD 80:20 828 Inventive Example 1 | PACM/ TMD 70:30 828 Inventive Example 2 | PACM/HDA 80:20 828 Inventive Example 3 | PACM/ Dytec-A 80:20 828 Inventive Example 4 | IPD 100 828 Comparative Example 2 | IPD/TMD 80:20 828 Comparative Example 3 | TMD 100 828 Comparative Example 4 |
|---|---|---|---|---|---|---|---|---|
| Vestamin PACM | 100 | 80 | 70 | 80 | 80 | | | |
| Vestamin TMD | | 20 | 30 | | | | 20 | 100 |
| Vestamin IPD | | | | | | 100 | 80 | |
| HDA | | | | 20 | | | | |
| Dytec A | | | | | 20 | | | |
| EPIKOTE828 | 358 | 381 | 393 | 416 | 416 | 441 | 448 | 475 |
| Tg (DSC) after curing, 30' @ 120° C. | 134° C. | 130° C. | 129° C. | 129° C. | 134° C. | 129° C. | 117° C. | 104° C. |
| $K_{1c}$ [MN/m$^{3/2}$] (curing, 30' @ 120° C.) Flexural test, DIN EN ISO 178 | 0.79 | 0.90 | 1.00 | 1.00 | 1.0 | 0.64 | 0.64 | 1.4 |
| Flexural strength [MPa] | 110 | 112 | 108 | 101 | o | 130 | 113 | 87 |
| Tensile strain [%] or maximum strain [%] | 6.2 | 6.6 | 7.0 | 7.1 | o | 6.2 | 5.7 | 7.1 |
| Modulus of elasticity [MPa] | 2572 | 2587 | 2602 | 2510 | o | 2896 | 2707 | 2673 |

HDA was purchased from Sigma Aldrich.
EPIKOTE 828 was purchased from Momentive.

Discussion of Results:

It was known that Vestamin TMD-cured epoxy resin formulations provide higher fracture toughness of the cured formulations with—however—low Tg (Comparative Example 4). In the attempt to improve the fracture toughness of Vestamin PACM- and Vestamin IPD-cured compositions through appropriate formulation of these hardeners with Vestamin TMD, it was surprisingly found to be possible, with PACM-based formulations, to increase the fracture toughness (K1c) and also the tensile strain at break without significant sacrifices in terms of glass transition temperature. Flexural strength and flexural modulus of elasticity also remain unchanged (Inventive Examples 1 and 2) within the bounds of experimental variation. A similar effect can be observed (Inventive Example 3) when HDA is used as open-chain polyamine. If, however, a hardener mixture with the same proportions (here 80:20 parts by weight) is produced from Vestamin IPD and Vestamin TMD, the result is no improvement in fracture toughness, but the expected marked deterioration of thermal (glass transition temperature) and mechanical properties (Comparative Example 3).

The invention claimed is:

1. A curable composition, comprising:
   an epoxy resin;
   an open-chain polyamine having at least two primary amine groups on an aliphatic main chain having a carbon chain consisting of carbon atoms and hydrogen atoms; and
   a compound of the formula (I)

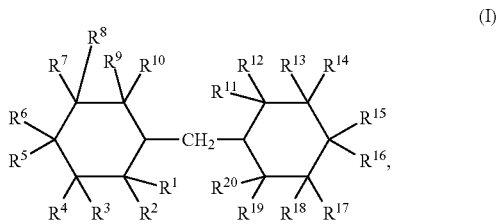

wherein the moieties $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ respectively and mutually independently are selected from the group consisting of hydrogen, methyl, ethyl, propyl, isopropyl and amine,
   with the proviso that at least one moiety from the group consisting of $R^1$, $R^2$, $R^3$, $R^4$, $R^5$, $R^6$, $R^7$, $R^8$, $R^9$ and $R^{10}$ is amine and at least one moiety from the group consisting of $R^{11}$, $R^{12}$, $R^{13}$, $R^{14}$, $R^{15}$, $R^{16}$, $R^{17}$, $R^{18}$, $R^{19}$ and $R^{20}$ is amine.

2. A method of curing the curable composition of claim 1, the method comprising:
   hardening or curing the epoxy resin with a hardener combination comprising the open-chain polyamine and the compound of the formula (I).

3. The curable composition according to claim 1, wherein precisely one moiety from the group consisting of $R^1$, $R^2$, $R^3$, $R^4$, $R^5$, $R^6$, $R^7$, $R^8$, $R^9$ and $R^{10}$ is amine and precisely one moiety from the group consisting of $R^{11}$, $R^{12}$, $R^{13}$, $R^{14}$, $R^{15}$, $R^{16}$, $R^{17}$, $R^{18}$, $R^{19}$ and $R^{20}$ is amine.

4. The curable composition according to claim 1, wherein precisely one moiety from the group consisting of $R^1$, $R^2$, $R^3$, $R^4$, $R^5$, $R^6$, $R^7$, $R^8$, $R^9$ and $R^{10}$ is amine and precisely one moiety from the group consisting of $R^{11}$, $R^{12}$, $R^{13}$, $R^{14}$, $R^{15}$, $R^{16}$, $R^{17}$, $R^{18}$, $R^{19}$ and $R^{20}$ is amine and every other moiety is hydrogen.

5. The curable composition according to claim 1, wherein the compound of the formula (I) is diaminodicyclohexylmethane.

6. The curable composition according to claim 1, wherein the open-chain polyamine has a substituted or unsubstituted carbon chain having a total length of from four to eight carbon atoms.

7. The curable composition according to claim 1, wherein the open-chain polyamine has the formula $H_2N—(CH_2)_z—NH_2$ in which z is from 2 to 12.

8. The curable composition according to claim 1, wherein the open-chain polyamine is hexamethylenediamine or trimethylhexamethylenediamine.

9. The curable composition according to claim 1, wherein a ratio by weight of the compound of the formula (I) to the open-chain polyamine is at least 50:50.

10. The curable composition according to claim 9, wherein a ratio by weight of the compound of the formula (I) to the open-chain polyamine is from 70:30 to 90:10.

11. The curable composition according to claim 1, wherein the epoxy resin is at least one selected from the group consisting of bisphenol A diglycidyl ether and bisphenol F diglycidyl ether.

12. The curable composition according to claim 1, further comprising:
    at least one further substance selected from the group consisting of a reaction accelerator, a reactive diluent, a solvent, a pigment, a filler, a flame retardant, and an additive.

13. The curable composition according to claim 1, further comprising:
    a reactive diluent,
    wherein a ratio by weight of the epoxy resin to the reactive diluent is from 75:25 to 95:5.

14. A process for coating a surface or impregnating a textile sheet, comprising:
    applying the curable composition according to claim 1 to the surface or the textile sheet; and
    hardening the curable composition.

15. A curable composition according to claim 1, wherein the epoxy resin has two epoxy groups per molecule.

16. A hardened composition, obtained by curing the curable composition according to claim 1.

17. A surface, fibre composite material, coating or adhesive, comprising:
    the hardened composition according to claim 16.

18. The curable composition according to claim 1,
    wherein the epoxy resin comprises bisphenol A diglycidyl ether, bisphenol F diglycidyl ether, or both,
    the open-chain polyamine comprises hexamethylenediamine, trimethylhexamethylenediamine, or both, and
    the compound of the formula (I) comprises diaminodicyclohexylmethane.

19. The curable composition according to claim 18, wherein a ratio by weight of the compound of the formula (I) to the open-chain polyamine is from 70:30 to 90:10.

20. The curable composition according to claim 18, wherein a ratio by weight of the compound of the formula (I) to the open-chain polyamine is from 70:30 to 80:20.

21. The curable composition according to claim 1, wherein a ratio by weight of the compound of the formula (I) to the open-chain polyamine is from 70:30 to 80:20, and an amount of the epoxy resin is from 381 to 416 parts by weight with respect to 100 parts by weight of a combination of the open-chain polyamine and the compound of the formula (I).

22. The curable composition according to claim 1, wherein the curable composition is capable of curing at 120° C. for 30 minutes to a cured composition having a fracture toughness of at least 0.9 and a glass transition temperature of at least 129° C.

* * * * *